United States Patent
Parkvall et al.

(10) Patent No.: US 8,345,592 B2
(45) Date of Patent: Jan. 1, 2013

(54) METHOD AND ARRANGEMENT FOR REDUCING POWER CONSUMPTION IN USER EQUIPMENTS IN MULTI-CARRIER RADIO SYSTEMS

(75) Inventors: Stefan Parkvall, Stockholm (SE); Vera Vukajlovic, Stockholm (SE); Gabor Fodor, Hässelby (SE); Muhammad Kazmi, Bromma (SE); Karl Olof Joakim Bergström, Stockholm (SE); Magnus Lindström, Spånga (SE); Anders Furuskär, Stockholm (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 672 days.

(21) Appl. No.: 12/513,297

(22) PCT Filed: Oct. 18, 2007

(86) PCT No.: PCT/SE2007/050750
§ 371 (c)(1),
(2), (4) Date: May 1, 2009

(87) PCT Pub. No.: WO2008/054306
PCT Pub. Date: May 8, 2008

(65) Prior Publication Data
US 2010/0067418 A1 Mar. 18, 2010

(30) Foreign Application Priority Data
Nov. 1, 2006 (SE) .................................. 0602307

(51) Int. Cl.
*H04B 7/185* (2006.01)
(52) U.S. Cl. ......................................... 370/318
(58) Field of Classification Search .................. None
See application file for complete search history.

(56) References Cited

U.S. PATENT DOCUMENTS

| | | | |
|---|---|---|---|
| 2002/0159426 A1* | 10/2002 | Kanemoto et al. | 370/342 |
| 2006/0256887 A1* | 11/2006 | Kwon et al. | 375/260 |
| 2007/0036123 A1* | 2/2007 | Armour et al. | 370/344 |
| 2008/0299932 A1* | 12/2008 | Belogolovy et al. | 455/296 |
| 2009/0010214 A1* | 1/2009 | Bui | 370/329 |
| 2009/0093257 A1* | 4/2009 | Rinne et al. | 455/452.1 |

* cited by examiner

Primary Examiner — Anh-Vu Ly

(57) ABSTRACT

The present invention relates to a method and an arrangement for reducing power consumption in the user equipments in power saving mode in a communication network, comprising a communication network node transmitting information on shared control channels (SCCH) to one or more user equipments. The information is transmitted over either a narrow or a wide bandwidth depending on which mode said one or more user equipments are, either a power saving mode or an active mode.

10 Claims, 3 Drawing Sheets

METHOD AND ARRANGEMENT FOR REDUCING POWER CONSUMPTION IN USER EQUIPMENTS IN MULTI-CARRIER RADIO SYSTEMS

TECHNICAL FIELD

The present invention relates to a method and an arrangement in a communication system, and in particular to an arrangement allowing for efficiently utilizing radio resources in a communication network as well as a method for such utilization.

BACKGROUND

In many wireless systems Shared Control Channels (SCCHs) are used in the physical layer to carry transport channels in the downlink direction. For example, in UMTS the Physical Downlink Shared Channel (PDSCH) can be used to carry the Downlink Shared Channel (DSCH) transport channel.

Shared Control Channels are used to convey information on which user equipments are scheduled on what resources (including time, frequency and code resources) and how user equipments should decode the transmitted signal. The Shared Control Channels typically address user equipments in active modes (i.e. non-power saving modes). Recently, it has however been proposed to use Shared Control Channels also for addressing user equipments in power saving modes (e.g. in discontinuous reception modes or idle modes). Thereby the need for a dedicated physical channel to support, e.g., the paging transport channel is eliminated. For example, in a Universal Mobile Telecommunications System (UMTS) the Secondary Common Control Physical Channel (S-CCPCH) has the (dedicated) task to carry the Paging Channel (PCH) and the Forward Access Channel (FACH).

In order to achieve frequency and intercell interference diversity (such as to allow the Shared Control Channels to experience an average of the intercell interference and to avoid them being affected by single high power interferers), these physical channels should be interleaved (or 'spread') over a wide frequency band. In OFDM-based communication systems such channels should, e.g., be interleaved over a pseudo-random set of subcarriers covering a large part of the total system bandwidth.

On the other hand, in order to limit power consumption in user equipments that are receiving (and/or detecting) the Shared Control Channels, it is desirable to interleave said Shared Control Channels on a frequency band that is as narrow as possible. This is due to the fact that power consumption can be regarded as a function that increases with the receiver bandwidth, i.e. receiving a wide-band signal consumes more power than receiving a narrow-band signal. This is especially important for user equipments in power saving modes because in such modes, in which user equipments normally spend most of their time, the power that need to be spend for reception of the Shared Control Channel constitutes a considerable amount of the overall power consumption and, hence, directly affects the stand-by time of the mobile.

SUMMARY

Accordingly, it is an object of the present invention to provide an improved method for efficiently utilizing the radio resources in a communication network, comprising a communication network node transmitting information on control channels to one or more user equipments.

This object is achieved by the method according to the characterising portion of claim 1.

Another object of the present invention is to provide an improved arrangement for efficiently utilizing the radio resources in a communication network, comprising a communication network node transmitting information on control channels to one or more user equipments.

This other object is achieved by an arrangement according to the characterising portion of claim 5.

Further embodiments are listed in the dependent claims.

Due to the provision of a method and arrangement in which a shared control channel, SCCH, is mapped to physical resources spanning a wide or narrow bandwidth, an improved robustness of control channels and/or reduced power consumption in the user equipment can be obtained.

Still other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

DETAILED DESCRIPTION

Figure 1:
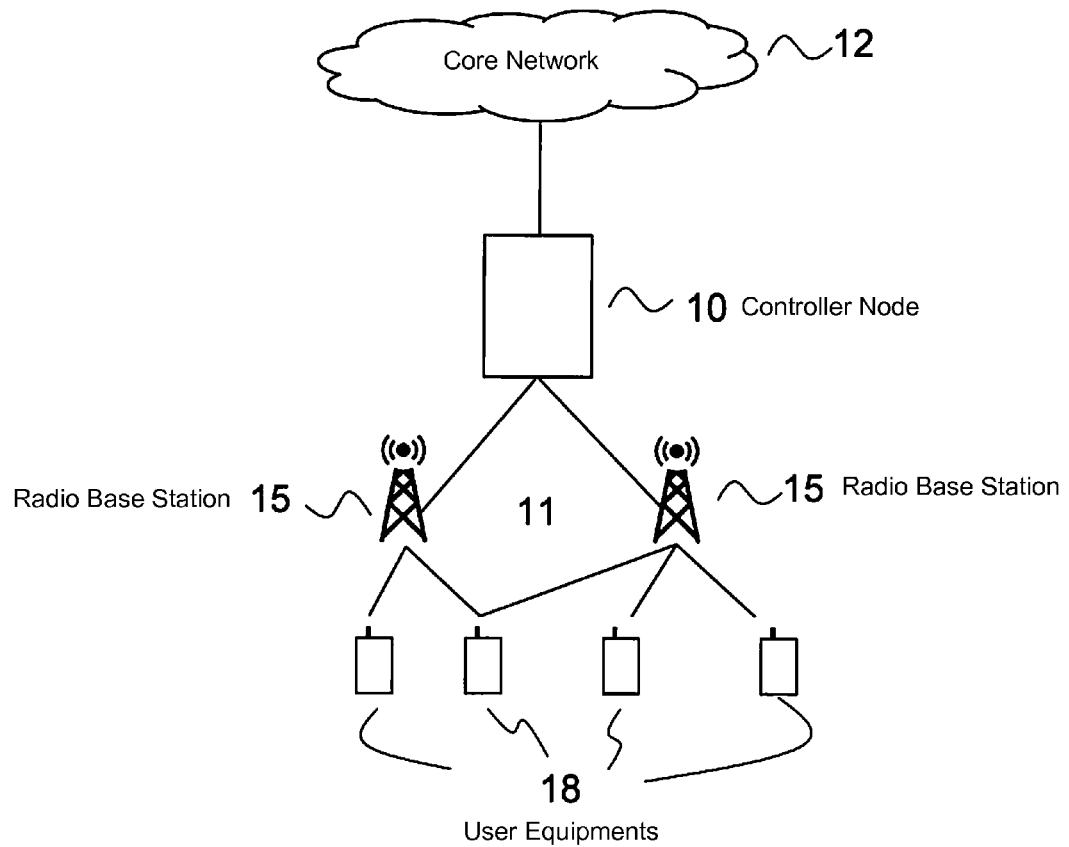
FIG. 1 illustrates the architecture of a communication network as assumed by the present invention.

FIG. 1 depicts a communication system including a Radio Access Network (RAN) 11, which can—as one conceivable example—be a UMTS Terrestrial Radio Access Network (UTRAN) or evolved UTRAN (E-UTRAN), comprising at least one Radio Base Station (RBS) (or Node B/eNode B) 15 (two are shown in FIG. 1) connected to one or more controller nodes 10, e.g. Radio Network Controllers (RNCs) in the case of UTRAN. The Radio Access Network 11 is connected to a Core network (CN) 12. Radio Access Network 11 and Core Network 12 provide communication and control for a plurality of user equipments (UE) 18 (or mobile stations) that each uses downlink (DL) channels and uplink (UL) channels. On the downlink channel, the Radio Base Station 15 transmits to each user equipment at respective power level. On the uplink channel, the user equipments 18 transmit data to the Radio Base Station 15 at respective power level.

The present invention provides a method for interleaving the Shared Control Channel (SCCH) on a wide bandwidth when it addresses user equipments in non-power saving modes (e.g. active mode) and interleaving the Shared Control Channel on a narrow bandwidth when it addresses user equipments in power-saving modes.

A further embodiment of the present invention assumes the case that there is no SCCH information available for user equipments in a power saving mode such that the narrow band SCCH may be used to address user equipments in a non-power saving mode. Hence, no resources are wasted in this case.

Thus, the present invention refers to a Shared Control Channel (SCCH) that is mapped/transmitted over a wide frequency band when the SCCH addresses user equipments in an active mode (i.e. a non-power saving mode) and that is mapped/transmitted over a narrow frequency band when the SCCH addresses user equipments in an idle mode (i.e. a power saving mode).

Examples of signals addressing user equipments in power saving modes include, for instance, Paging Indications (pointing to a paging message), Paging Messages, Broadcast Indications (pointing to a broadcast message), or Broadcast Messages.

In more detail, and interpreting the terms 'non-power saving mode' and 'power saving mode' in a broad sense, the method according to the present invention involves the following steps to be performed:
- pre-defining a subset of Transmission Time Intervals (TTI) that the base station and the user equipments have "agreed upon". In said subset the Shared Control Channels (SCCH) may address user equipments in power saving modes (likewise, subsets can be defined for user equipments in a non-power saving mode). As an example, this can be performed in every $N^{th}$ TTI. Alternatively, the pre-defining implies that the network uses the narrow bandwidth whenever it intends to page a user equipment while using the wide bandwidth otherwise.
- defining a first (wideband) SCCH mapping pattern for user equipments in a non-power saving mode (e.g. an active mode);
- defining a second (narrowband) SCCH mapping pattern for user equipments in a power saving mode;
- applying the first mapping pattern for TTIs that are not addressing user equipments in power saving modes;
- applying the second mapping pattern for TTIs that are addressing user equipments in power saving modes.

Figure 4:
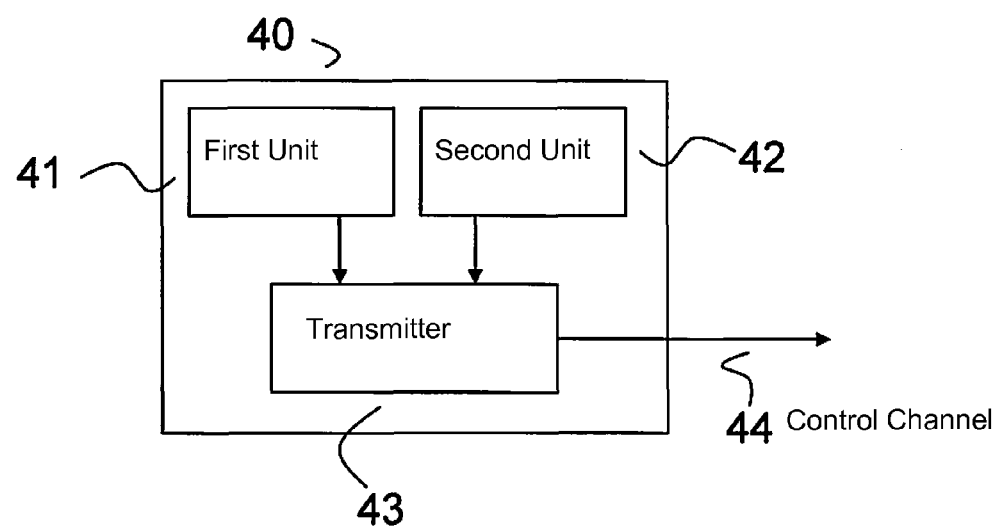
FIG. 4 illustrates an arrangement in or associated with a communication network node for transmitting information on control channels to user equipments.

The present invention also relates to an arrangement for achieving the afore-described method. The arrangement 40, as depicted in FIG. 4, is included in or associated to a communication network node 15 for transmitting information on control channels to one or more user equipments 18 and comprises a first unit 41 for providing subsets of Transmission Time Intervals such as to determine at which instances a control channel may address a user equipment in a power saving mode or non-power saving mode; and a second unit 42 for providing a first, wideband mapping pattern for user equipments in a non-power saving mode and a second, narrowband mapping pattern for user equipments in a power saving mode. A transmitter 43 is adapted to transmit, during Transmission Time Intervals of pre-defined subsets associated to a respective power mode, said information over the control channel 44 by using the mapping pattern that is defined for said respective power mode of the user equipment.

In a first additional feature of the method according to the present invention one or more of the Shared Control Channels always use the narrowband mapping/transmission in cases where many such Shared Control Channels are sent in parallel.

In a second additional feature of the method according to the present invention the Shared Control Channel using the narrowband mapping/transmission is sent 'on top of' the other Shared Control Channels. In this case said other Shared Control Channels loose the part of their signals that is covered by the narrow banded Shared Control Channel.

A first embodiment of the present invention concerns OFDM-based systems, for which a wide band transmission can be realized by mapping the SCCH information on a subset of non-contiguous subcarriers that cover almost the whole system bandwidth. A narrow band transmission can be realized by mapping the subcarriers on a contiguous subset of subcarriers.

Figure 2:
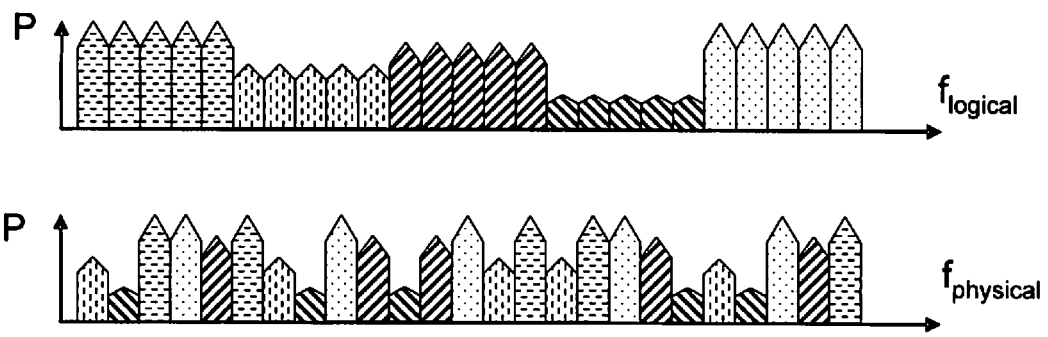
FIG. 2 illustrates the default mapping of SCCHs on subcarriers (depictive only, typically one L1/L2 would comprise about 60 subcarriers).

FIG. 2 shows an example of a mapping of five Shared Control Channels for the case where all of them address user equipments in active modes.

Figure 3:
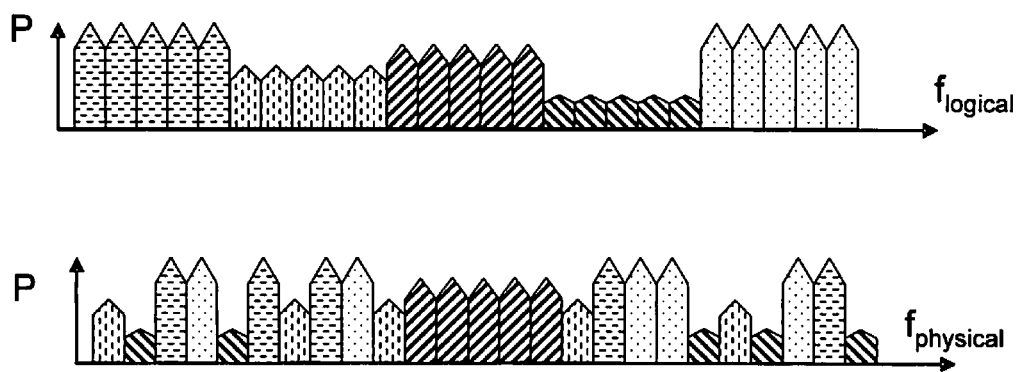
FIG. 3 illustrates the special mapping of SCCHs on subcarriers in TTIs where a paging indication may occur. The SCCH with the paging indication is mapped to narrow frequency band (depictive only, typically one L1/L2 would comprise about 60 subcarriers).

FIG. 3 shows an example of how the same Shared Control Channels are mapped for the case that one of them (the middle one) addresses user equipments in a power saving mode.

According to a second embodiment, the method can straightforwardly be used for 3G Long Term Evolution (LTE). The paging channel indication is sent on the Shared Control Channel which uses a narrowband interleaving.

To achieve frequency and intercell interference diversity (in order for the sensitive L1/L2 control channels to experience an average of the intercell interference and avoid being hit by single high power interferers), these channels are mapped on a pseudo random set of subcarriers. Such a mapping principle is depicted in FIG. 2. This mapping achieves the desired frequency and interference diversity characteristics.

For the paging indicator channel this implies that the channels are spread over a large bandwidth up to the UE reception capability (e.g. 15 MHz), which will lead to an increased power consumption. For reference, the bandwidth monitored by WCDMA UEs is 5 MHz, and for GSM UEs 200 kHz.

Transmitting paging indications on L1/L2 control channels which are mapped/spread over a wide bandwidth will lead to an increased power consumption. One alternative to mitigate this is to apply some special mapping of one L1/L2 control channel (with limited bandwidth, e.g. 1.25 MHz as the BCH): This could be done in every TTI, or only in TTIs where the paging indications occur, see FIG. 3.

The invention claimed is:

1. A method for efficiently utilizing radio resources in a communication network comprising a communication network node transmitting information on control channels to one or more user equipments, comprising:
   - defining a subset of Transmission Time Intervals in order to determine at which instances a control channel may address a user equipment in a power saving mode or non-power saving mode;
   - defining a first, wideband mapping pattern for user equipments in a non-power saving mode;
   - defining a second, narrowband mapping pattern for user equipments in a power saving mode;
   - transmitting, during Transmission Time Intervals of a subset associated to a respective power mode, said information over the control channel by using the mapping pattern that is defined for the respective power mode of the user equipment; and
   - wherein information is allowed to be transmitted over the control channel to user equipments in non-power saving modes by using the second mapping pattern if no information is to be transmitted to user equipments in a power saving mode.

2. The method according to claim 1, wherein said second mapping pattern is used for signalling of indications pointing to a certain message.

3. The method according to claim 1, wherein said second mapping pattern is used for at least one of paging and broadcast messages.

4. The method according to claim 1, wherein using said second mapping pattern implies mapping on a pseudo-random set of subcarriers.

5. The method according to claim 1, whereby using said first mapping pattern implies a mapping on a subset of non-contiguous subcarriers covering a major part of a system bandwidth.

6. The method according to claim 1, wherein using said second mapping pattern implies a mapping on a subset of contiguous subcarriers.

7. The method according to claim 1, wherein said control channel is interleaved on a wide or narrow bandwidth depending on the power mode of the user equipment.

8. The method according to claim 1, wherein the communication network applies Orthogonal Frequency Division Multiplexing (OFDM).

9. An apparatus for efficiently utilizing radio resources in a communication network, said apparatus included in or associated to a communication network node for transmitting information on control channels to one or more user equipments, comprising:

- a first unit for providing subsets of Transmission Time Intervals in order to determine at which instances a control channel may address a user equipment in a power saving mode or non-power saving mode;
- a second unit for providing a first, wideband mapping pattern for user equipments in a non-power saving mode and a second, narrowband mapping pattern for user equipments in a power saving mode;
- a transmitter adapted to transmit, during Transmission Time Intervals of pre-defined subsets associated to a respective power mode, said information over the control channel by using the mapping pattern that is defined for the respective power mode of the user equipment; and
- wherein information is allowed to be transmitted over the control channel to user equipments in non-power saving modes by using the second mapping pattern if no information is to be transmitted to user equipments in a power saving mode.

10. The apparatus according to claim 9, wherein the communication network applies Orthogonal Frequency Division Multiplexing (OFDM).

* * * * *

UNITED STATES PATENT AND TRADEMARK OFFICE
CERTIFICATE OF CORRECTION

PATENT NO.      : 8,345,592 B2
APPLICATION NO. : 12/513297
DATED           : January 1, 2013
INVENTOR(S)     : Parkvall et al.

It is certified that error appears in the above-identified patent and that said Letters Patent is hereby corrected as shown below:

In Column 2, Line 59, delete "at" and insert -- 18 at --, therefor.

Signed and Sealed this
Second Day of April, 2013

Teresa Stanek Rea
*Acting Director of the United States Patent and Trademark Office*